Patented July 15, 1930

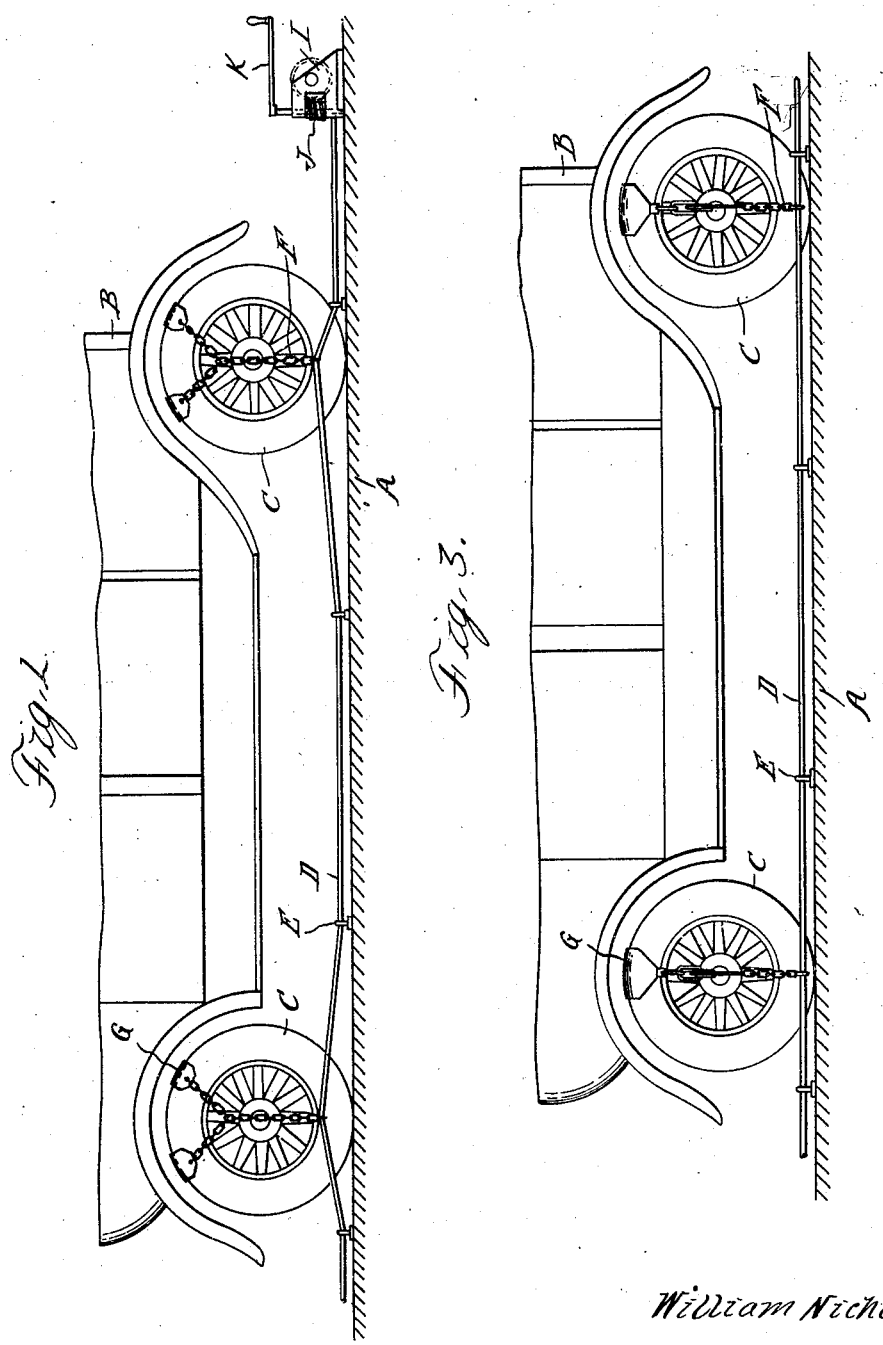

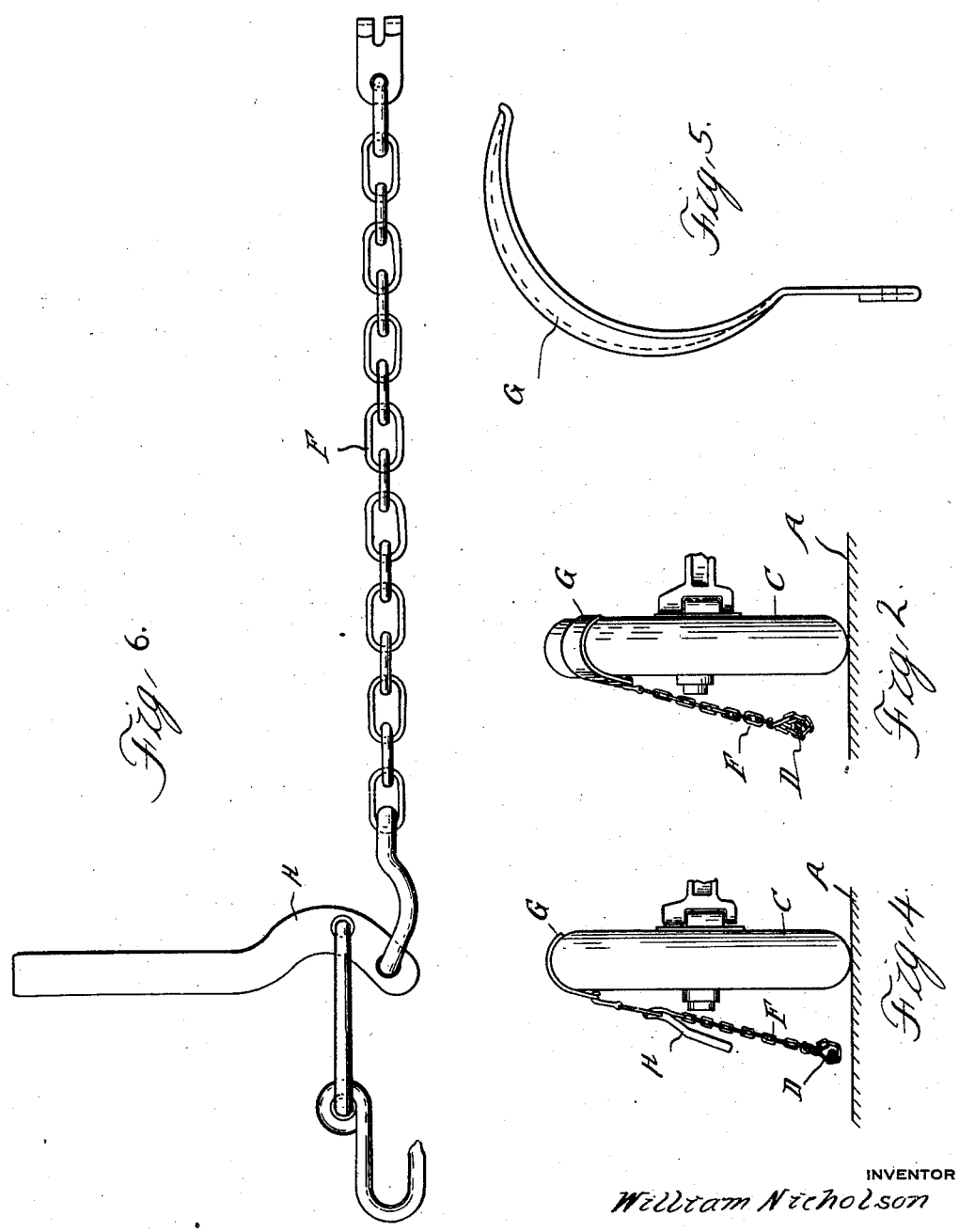

1,770,798

UNITED STATES PATENT OFFICE

WILLIAM NICHOLSON, OF RIVER ROUGE, MICHIGAN

APPARATUS FOR SECURING WHEELED VEHICLES TO THE DECKS OF SHIPS OR OTHER CARRIERS

Application filed October 22, 1928. Serial No. 314,305.

This invention relates to anchoring means for holding wheeled vehicles from movement on the deck or floor of the carrying vehicle, and the invention consists of peculiar construction as hereinafter set forth.

In the drawings:

Figure 1 is a side elevation showing a motor vehicle secured to the deck or floor of a carrier by my improved holding means.

Figure 2 is an end elevation of one of the wheels with the device applied;

Figures 3 and 4 are views respectively similar to Figures 1 and 2 showing a modified construction.

Figure 5 is an end elevation of one of the wheel engaging clips or saddles, and

Figure 6 is an elevation of one of the chains or connections between the clip and cable in the modification illustrated in Figures 3 and 4.

In the transportation of motor vehicles on ships it is necessary either to remove the wheels or to provide some means for anchoring the machines from movement during transportation. Where the vehicles are carried on the decks of ships it is necessary either to provide anchorage at fixed points on the deck or to provide temporary anchorage which is injurious to the deck. Where the anchoring devices are in fixed position they are only adapted for the securing of vehicles of a predetermined wheel base length, but as the length of the wheel base varies with different vehicles, such an arrangement is not desirable. On the other hand, the shifting of the anchors from one point to another on the deck is equally undesirable, as it will be injurious to the deck.

With my improved construction I have overcome the defect by the use of longitudinally extending cables extending through bearings which secure them to the deck and affording anchorage connection for the vehicles intermediate such bearings. I further utilize these cables as means for simultaneously placing the required tension on all of the securing devices for the various cars that are held by the same cable, this greatly facilitating both attachment and release.

As shown in Figure 1, A represents the deck of a ship, B a motor vehicle to be stored on the deck and which is provided with wheels C. D is a cable which is passed through a series of eye bolts E and securely fastened at its opposite ends. F are chains or other connections secured at their lower ends to the cable D and provided at their upper ends with clips or saddles G for engaging the top portion of the vehicle wheel. These clips or saddles G may either be arranged centrally above the axis of the wheel as shown in Figure 3 or in pairs upon opposite sides of the axis as shown in Figure 2.

To secure the car from movement a certain tension must be applied to the chains or connections F. This may be accomplished either by providing each chain with a tensioning device such as the toggle lever H illustrated in Figure 4, or preferably by applying tension to the chains through the tightening of a cable D. Thus, as shown in Figure 1 one end of the cable is attached to a windlass I which may be operated through the worm gearing J and crank K. This construction permits of the slackening of the cable D so that all of the clips or saddles may be readily placed in engagement with the wheels of the different cars and then by winding up the windlass I all of these connections are simultaneously placed under tension. As a consequence movement of the cars on the deck is effectually prevented as long as the tension is maintained. As soon as the destination is reached the cables D may be again slackened, the clips or saddles removed, and the vehicles driven on their own wheels from the deck.

What I claim as my invention is:

1. A securing device for wheeled vehicles comprising a cable extending longitudinally of the vehicle, anchor eyes secured to the deck or floor at distributed points and through which said cable is drawn, holding down means for the vehicle wheels connected to said cable, and means for tensioning said cable to simultaneously tension all of said holding down means.

2. A securing device for wheeled vehicles comprising a cable extending along the deck or floor, anchoring eyes through which said cable is passed, secured to said deck or floor at distributed points, clips or saddles for engaging the wheels of the vehicle, connections between said clips or saddles and said cable adapted when the cable is slackened to permit of the engagement or disengagement of said clips, and means for taking up the slack in said cable to simultaneously tension all of said connections.

3. The combination with a deck or floor on which vehicles are stored, of a member extending longitudinally of the vehicles above said deck or floor, anchors secured to said deck or floor at spaced intervals with which said longitudinally extending member is engaged and holding down means for the vehicle secured to said longitudinally extending member.

4. The combination with a deck or floor on which vehicles are stored, of a member extending longitudinally of said vehicles above said deck or floor, anchors secured at intervals to said deck or floor with which said longitudinally extending member is engaged, holding down means for the vehicle engaging said longitudinally extending member and means for tensioning said holding down means to secure the vehicle from displacement.

5. The combination with a deck or floor on which vehicles are stored, of a cable extending longitudinally of the vehicles, anchors secured to said deck or floor at intervals and with which said cable is engaged, a clip or saddle for engaging the vehicle wheel, a connection from said clip to said cable and means for tensioning said connection.

In testimony whereof I affix my signature.

WM. NICHOLSON.